United States Patent [19]

Bonyhard et al.

[11] 3,868,661

[45] Feb. 25, 1975

[54] MAGNETIC BUBBLE PASSIVE REPLICATOR

[75] Inventors: Peter Istvan Bonyhard, Edison; Yu-Ssu Chen, New Providence; James Lanson Smith, Bedminster, all of N.J.

[73] Assignee: Bell Telephone Laboratories Incorporated, Murray Hill, N.J.

[22] Filed: Oct. 15, 1973

[21] Appl. No.: 406,639

[52] U.S. Cl. .................... 340/174 TF, 340/174 SR
[51] Int. Cl. .................... G11c 11/14
[58] Field of Search .................... 340/174 TF

[56] References Cited

UNITED STATES PATENTS

| | | | |
|---|---|---|---|
| 3,723,716 | 3/1973 | Bobeck et al. | 340/174 TF |
| 3,743,851 | 7/1973 | Kohara | 340/174 TF |

*Primary Examiner*—James W. Moffitt
*Attorney, Agent, or Firm*—H. M. Shapiro

[57] ABSTRACT

A passive bubble replicator is achieved by adding to a stage of a multistage, fine-grained, field-access bubble propagate circuit, magnetic elements of a geometry to provide laterally spaced localized attracting poles and a repelling intermediate pole in the propagation path. Normal operation of the fine-grained propagate circuit provides poles which first expand a bubble laterally and thereafter cooperate with the intermediate pole to cut the expanded bubble.

8 Claims, 5 Drawing Figures

MAGNETIC BUBBLE PASSIVE REPLICATOR

FIELD OF THE INVENTION

This invention relates to magnetic memories in which information is represented as single wall, magnetic domains of the type commonly referred to as magnetic bubbles. More particularly, this invention relates to a magnetic circuit arrangement operative to replicate magnetic bubbles.

BACKGROUND OF THE INVENTION

U.S. Pat. No. 3,713,118 of I. Danylchuk, issued Jan. 23, 1973, discloses a field-access, bubble replicator which is "passive" in the sense that no control pulses are required to effect the replication of a bubble. Movement of a bubble as well as the replication function is realized in response to a uniform magnetic field (viz: field-access arrangement) reorienting in the plane of bubble movement. The various functions are determined by the geometries of magnetic elements coupled to the material in which the plane of movement is defined. The propagation function in that patent is implemented by y- and bar-shaped elements of magnetically soft permalloy. Alternative elements are of T and bar shapes or chevron shapes as disclosed in U.S. Pat. Nos. 3,534,347 of A. H. Bobeck and 3,723,716 and H. E. D. Scovil. The latter elements are closely spaced in a "fine-graned" arrangement and are often employed in increasingly larger numbers per stage to cause the lateral enlargement of domains as disclosed in U.S. Pat. No. 3,702,995 of A. H. Bobeck.

The arrangement shown in the Danylchuk patent has been found to exhibit shortcomings, particularly at high frequency operation. The Danylchuk patent, for example defines a bubble replicate function with a relatively large permalloy element about the periphery of which a bubble moves as the in-plane field reorients. Unfortunately, the periphery of this replicate element is necessarily long compared to the period of the multistage propagation pattern. Therefore, as the circuit is employed at increasingly higher speeds, the bubble becomes unable to negotiate the periphery of the element in the same time a data bubble traverses a stage of the propagation circuit and a failure occurs. In addition, the Danylchuk device provides for two bubbles at different positions on the periphery of the replicate element for each bubble introduced to the replicate element. Consequently, different numbers of stages are required in the various output channels to compensate for this different positioning. Moreover, under high bias conditions, a bubble does not spread out sufficiently along the periphery of the replicate element to permit transfers between input and output channel elements, on the one hand, and the replicate element on the other, as required by the Danylchuk arrangement. In practice, higher operating speeds and wider margins have been achieved for propagation, generation, detection, transfer, and annihilation functions than have been achieved by the Danylchuk arrangement.

U.S. Pat. No. 3,731,288 of A. Marsh issued May 1, 1973, also discloses a passive bubble replicator. But in that case, the bubble propagate elements themselves are cnfigured to provide two localized poles that move apart with the hope of attracting two ends of a bubble into two different tracks. Of course, under high bias fields the bubble goes only to the position of one of those poles and failures occur. Moreover, inasmuch as the propagate elements are modified to accomplish replication, they become less effective in carrying out the propagate function.

BRIEF DESCRIPTION OF THE INVENTION

The present invention is based on the recognition that closely spaced chevron-shaped elements, preferably with increasingly larger numbers of elements per stage, can be designed to advance an elongated bubble to a reference stage at which first and second output channels originate. In accordance with this invention, additional elements are provided between the reference stage and a next subsequent stage to provide two laterally spaced-apart, strong attracting poles and an intermediate repelling pole in response to the in-plane field. These poles are provided when the field reorients to a direction for which the remaining (chevron) elements of that stage exhibit repelling poles cooperating to advance a domain to that next subsequent stage. The result is a bifurcation, of laterally elongated bubbles there, thus providing two localized bubbles for advancement along the output channels. Operation in entirely passive, being responsive only to the propagation drive (in-plane) field.

In one embodiment, an increasing number of closely spaced chevron elements advances an increasingly wider bubble along a multistage channel to reference position or stage in response to a rotating in-plane field. First and second output channels of chevron and T-bar shaped elements, respectively, follow the reference stage in the propagation path. First and second elongated bars are spaced apart (laterally) from one another along an axis vertical to the axis of domain propagation and between the reference position and the start of the output channels. The bars are disposed so that when the in-plane field is aligned with the long direction of the bars, strong attractive poles are generated at like ends of the bars and strong repelling poles are generated at the other ends (viz: intermediate repelling poles). The chevron elements in the reference position simultaneously produce strong repelling poles in the spacing between those bars for advancing a domain to the output channels.

DETAILED DESCRIPTION

Figure 1:
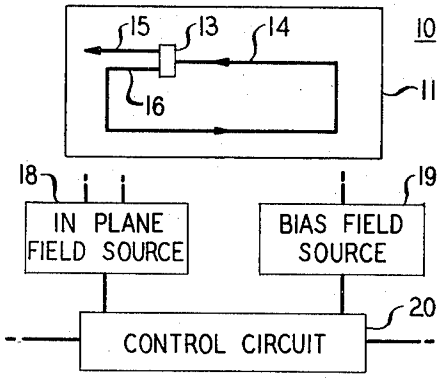
FIG. 1 is a schematic representation of a bubble arrangement in accordance with this invention.

FIG. 1 shows a magnetic arrangement 10 comprising a layer 11 of a material in which single wall domains (viz: magnetic bubbles) can be moved. Layer 11 typically is formed by liquid phase epitaxial techniques on a non-magnetic substrate, as is well known.

A plurality of channels is defined in layer 11 by a pattern of magnetic elements arranged in an adjacent plane in a well-known field-access arrangement. The channels are shown in diagram form in FIG. 1 and in detail in FIGS. 2, 3, 4, and 5. A replicate function is performed at a reference position represented by block 13 in FIGS. 1 and 2. An input channel for advancing bubbles to the reference position is represented at 14 in the figures. First and second output channels are represented at 15 and 16. Output channel 16 is connected to input channel 14, as indicated in the figures, to form a closed loop channel.

Closed loop channels of this type are particularly useful in the well-known major-minor bubble arrangement disclosed in P. I. Bonyhard, U. F. Gianola, and A. J. Perneski, U.S. Pat. No. 3,618,054. In the major-minor organization, a plurality of minor (storage) loops controllably transfer information to a major (communication) loop for detection and write functions. The closed loop channel (14 and 16 of FIG. 1) may be visualized as operative as such a major loop. In this contex, replication in accordance with this invention occurs in the major loop. One resulting bubble (in each of a succession of data bits) is returned to the minor loops (not shown) via channel 16, while the other resulting bubble (in each instance) is advanced along channel 15 to a detector not shown.

Figure 2:
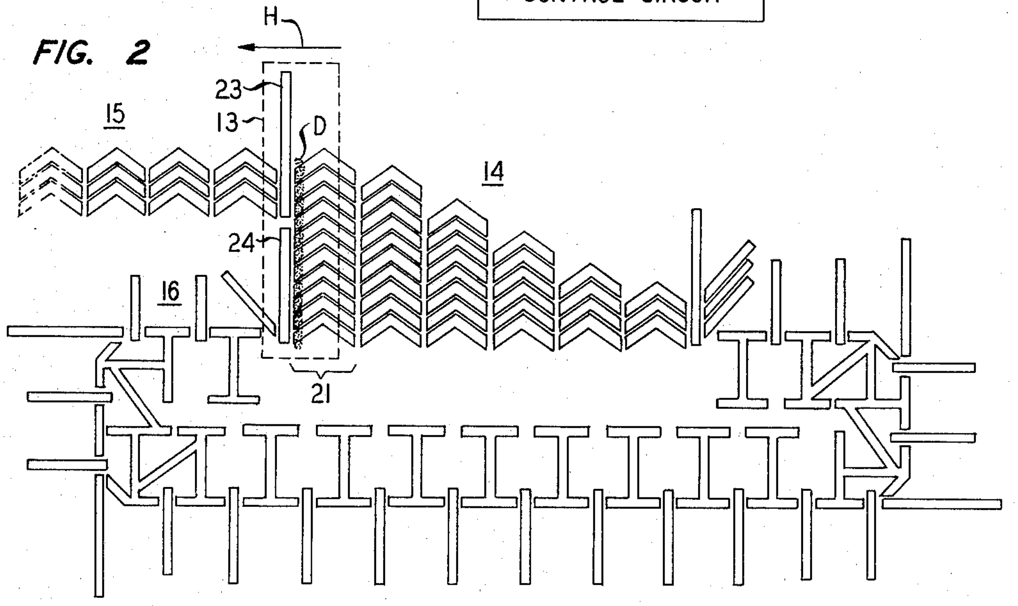
FIG. 2, 3, 4, and 5 are replicas of a computer printout of the pattern of elements for the arrangement of FIG. 1, showing the bubble geometry during a replication operation.

Movement of bubbles is in a counterclockwise direction, as viewed in the closed loop of FIG. 2. The permalloy elements have, illustratively, geometries to produce such movement for an in-plane field rotating counterclockwise in the plane of layer 11. Block 18 of FIG. 1 represents the familiar source of an in-plane field in field-access type bubble memories. Block 19 represents the familiar bias field source which maintains a bubble at an operating diameter. A control circuit 20 is operative to synchronize and activate the various sources with familiar other functional elements such as generators, detectors, and transfers not shown.

Operation of the replicator is explained in connection with FIGS. 2, 3, 4, and 5. We will assume that a bubble is moving from right to left in input channel 14, expanding laterally because of the increasing numbers of elements in the succeeding stages of that channel. We will consider the operation when the bubble arrives at the position shown for bubble D in FIG. 2. The in-plane field is directed to the left, in this instance, as indicated by arrow H in the figure. The domain occupies a postiion at the left edge (as viewed) of a set 21 of chevron elements constituting a reference stage. Just to the left of the reference stage is the origin of output channels 15 and 16. It can be seen that these channels are defined, illustratively, by chevron elements and by T- and bar-shaped elements, respecitvely. The difference in element geometry is a matter of choice for test purposes only. Block 13 can be seen to encompass this general area of the reference stage and the origins of the two channels, bubble replication occurring at that site.

Figure 3:
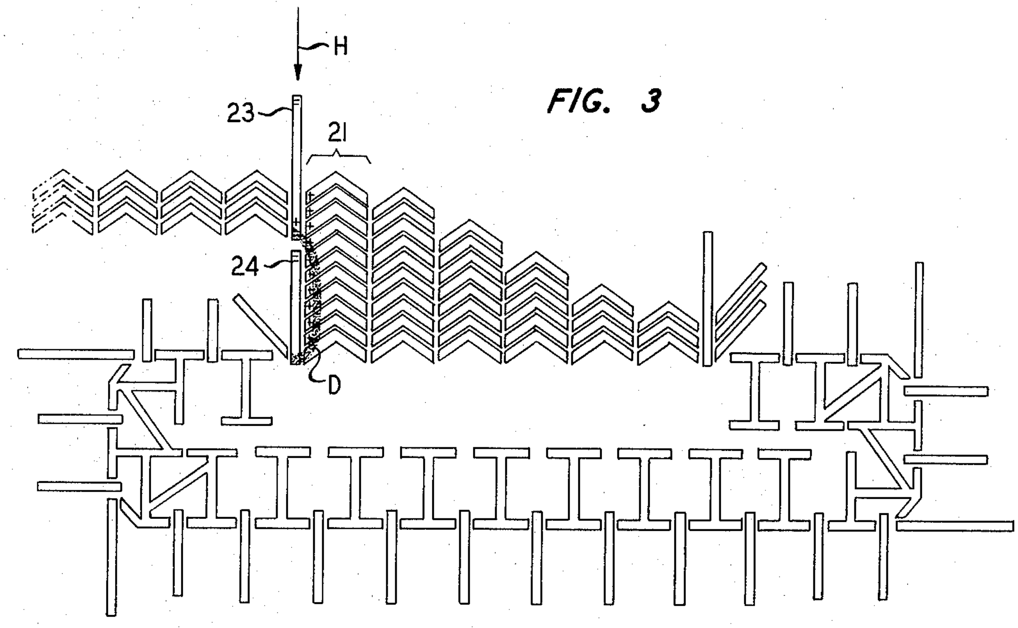

Replication occurs because of the presence of elements 23 and 24 in the embodiment of FIG. 2. When the in-plane field next reorients to a downward direction, as shown in FIG. 3, the lower ends of these elements become strongly positive magnetically. We will assume that positive poles attract a bubble and that negative poles repel a bubble herein. Domain D thus adheres strongly to the lower ends of the elements, for a downward oriented field, bowing to the right to follow positive poles simultaneously generated, along what may be visualized as the crest of a leftward moving wave of positive poles, to the left of the chevron elements of set 21.

Figure 4:
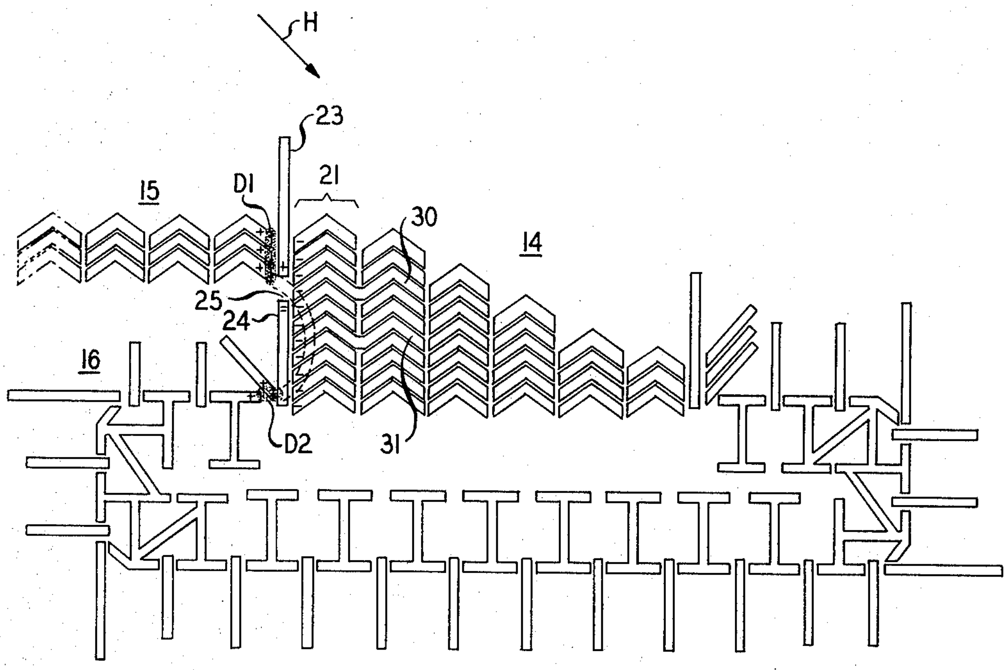

When the in-plane field next reorients downward and to the right, as shown in FIG. 4, the onset of separation of the bubble D into two bubbles occurs. The left ends of the elements of set 21 become negative for this field orientation (analogized with the trough of a wave) whereas the right ends of the elements of the adjacent stages of the output channels and the lower ends of elements 23 and 24 become positive. Moreover, the top end of element 24, at this juncture in the operation, becomes strongly negative. As a consequence, the tips of domain D of FIG. 3 become attracted to poles in the first stages of the respective output channels. The center of domain D, on the other hand, is trapped between two strong negative poles in area 25, the poles at the upper end of element 24 and the trough of the wave to the left of the elements of set 21. The result is two bubbles designated D1 and D2 in FIG. 4.

It is this unique bubble cutting action which provides attractive operating margins herein. Note that the line of positive poles advancing to the left along the chevrons, as can be seen by comparing FIGS. 3 and 4, pass through the pole array defined by elements 23 and 24. This action is responsive to a reorientation of the in-plane field. Thus, the propagation elements and the additional elements at the replication position are of geometries and so disposed that the reorientation of the in-plane field causes the lateral pole array (of elements 23 and 24) to remain unchanged over that portion of the in-plane field cycle operative to move a domain to the next stage of the path.

Figure 5:
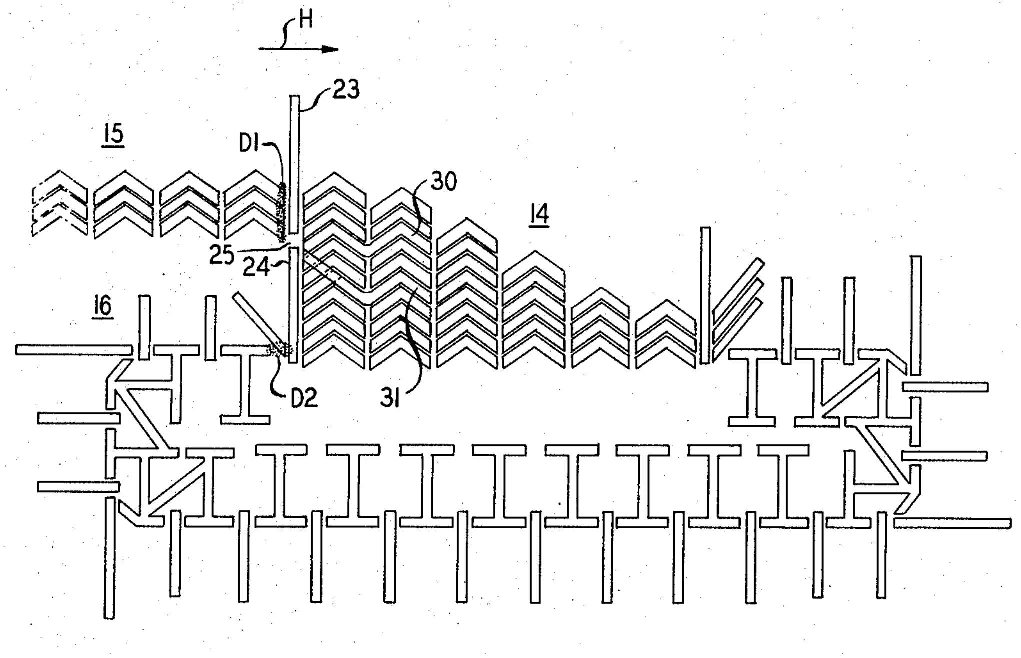

When the in-plane field next reorients to the right, as shown in FIG. 5, domains D1 and D2 advance further to the left along output channels 15 and 16, respectively.

It is apparent from the figures that the replicate operation requires only a smmall fraction of the length of a stage in any of the channels and, thus, frequency of operation is not deleteriously affected. Moreover, channel length is only negligibly varied by the inclusion of the replicate function. In addition, operation is achieved under high bias conditions because lateral elongation of a bubble occurs in spite of high bias conditions since the presence of positive poles along the elements of set 21, as shown in FIG. 3 cause lateral elongation of a domain even under high bias conditions. Consequently, wide operating margins are achieved even in high frequency operation.

The operating margins achieved in accordance with this invention depend on the strength of the attractive and repelling poles generated in the reference position when cutting occurs. To a large extent, elements 23 and 24 generate increasingly stronger poles for increasingly longer elements. The origins of the output channels, of course, are close to the ends of the elements where those poles are generated. Another consideration is that the top end of element 24 be spaced apart from the lower end of element 23 in order to avoid closely spaced positive and negative poles (see FIG. 3) from canceling one another in effect.

An increased repelling pole strength is achieved also by connecting some elements of adjacent stages of channel 14. This interconnection forms chevron elements illustratively two stages long, as shown at 30 and 31 in FIGS. 4 and 5. The result is particularly strong cutting poles between the ends of these elements and the top of element 24 as viewed in FIG. 4.

Typically the field-access pattern of FIG. 2 is designed with the output channel 15 terminating in an active guard rail of the type disclosed in A. H. Bobeck, U.S. Pat. No. 3,729,726 issued Apr. 24, 1973. It is known to build a magnetoresistance expansion detector terminating in such a guard rail and having a single stage detector or a detector in each of two consecutive stages thereof. The guard rail may comprise chevron or T-shaped elements. In a typical test circuit arrangement in accordance with this invention, extra bubbles generated in channel 15 are merely annihilated by the guard rail operation for any margin and frequency studies performed.

In one test arrangement of the type shown in FIG. 2, an epitaxial layer of $Sm_{0.5}Y_{25}Ga_{1.2}Fd_{3.8}O_{12}$, $5\mu m$ thick was grown by well-known liquid phase techniques on a layer of nonmagnetic Gadolinium Gallium Garnet. Bubbles having a nominal diameter of $6\mu m$ were maintained by a bias field of 100oe. In-plane field frequencies of from 0 to 100 kHz (in bursts) were employed. Replication occurred over a wide range of bias field values.

In this type of test circuit with element 24 considerably shorter than shown in FIG. 2, propagation at 100 kHz was realized with a 35 oersted in-plane field over a bias range of 99 to 111.5 oersteds. Replication occurred over a bias range of 105 to 111.5.

The lengthening of element 24 to the geometry shown in the figure strengthens the pole array as described to overcome the failure to replicate at the lower in-plane field level. Since field strength and the lengths of elements 23 and 24 determine pole strength, it is anticipated that even lower (less than 30 oersteds) field strengths would allow replication over almost the entire propagation range for elements of proper length. The optimistic expectation is based on the fact that at quasistatic speeds both propagation and replication are achieved over a bias range of from 99 to 122 oersteds in the above circuit. The increased pole strengths would lead to replication over a range of at least fifteen oersteds of this bias range by providing stronger repelling poles for cutting the domain during replication.

What has been described is considered merely illustrative of the principles of this invention. Accordingly, various modifications thereof can be derived by those skilled in the art in accordance with those principles within the spirit and scope of this invention as encompassed by the following claims:

What is claimed is:

1. Magnetic apparatus comprising a layer of material in which single wall domains can be moved, a multistage pattern of elements coupled to said layer operative responsive to a magnetic field reorienting in the plane of said layer to move domains from stage to stage along a path, said pattern defining in a reference stage a linear array of attracting poles for enlarging said domain laterally with respect to said path, said pattern also including an additional element arrangement between said reference stage and a next subsequent stage to produce first and second relatively strong attracting poles spaced apart laterally with respect to said path in response to said field, said additional element arrangement being of geometries and being disposed with respect to said elements of said reference stage in a manner to generate intermediate repelling poles for cutting a domain moved from said reference stage to a next subsequent stage.

2. Apparatus in accordance with claim 1 wherein said pattern comprises closely spaced chevron elements operative responsive to said field to generate advancing linear arrays of first attracting and then repelling poles for moving a domain along said path.

3. Apparatus in accordance with claim 2 wherein said additional element arrangement comprises first and second elongated elements having long dimensions thereof oriented laterally with respect to said path and separated from one another to form said spaced-apart attracting poles and said intermediate negative pole in said path for a first orientation of said field.

4. Apparatus in accordance with claim 3 wherein said chevron elements of said reference stage and said next subsequent stage are so disposed that said first and second elongated elements generate said attracting and intermediate repelling poles during the phase of said in-plane field when a domain is advanced from said reference stage to said next subsequent stage for cutting a domain into first and second laterally displaced domains.

5. Apparatus in accordance with claim 4 wherein said pattern of elements in said next subsequent stage defines the first stages of two separate paths for domains.

6. Apparatus in accordance with claim 5 wherein ones of the elements of said pattern in said reference stage and in a next preceding stage are interconnected for enhancing said cutting of said domain.

7. A magnetic arrangement comprising a layer of material in which single wall domains can be moved, a multistage pattern of magnetic elements coupled to said layer operative responsive to a magnetic field reorienting in the plane of said layer to move said domains along an axis of propagation from a first stage to a next subsequent stage, said pattern including closely spaced elements operative to provide a plurality of like poles in an arrangement to enlarge said domains laterally with respect to said axis, the number of said elements gradually increasing in ones of said stages preceding said first stage to effect a gradual lateral enlargement of said domain, said pattern also including first and second elements for providing between said first stage and said next subsequent stage an array of first and second laterally spaced-apart poles of a polarity to attract a domain and an intermediate repelling pole, said elements having geometries and being disposed to generate said array at a time when a domain is advanced from said first to said next subsequent stage.

8. A magnetic arrangement comprising a layer of material in which single wall domains can be moved, a pattern of magnetic propagation elements for moving said domains along a path from a first to a next subsequent stage in response to a reorienting in-plane field, said elements having geometries to generate linear arrays of moving attracting poles and repelling poles for moving and for simultaneously elongating said domains laterally with respect to the axis of said path at said first stage, said pattern also including elements between said first and said next subsequent stage for generating first and second attracting poles spaced apart laterally with respect to said axis as well as intermediate repelling poles for domains when said in-plane reorients in a direction for moving domains from said first to said next subsequent stage.

* * * * *